(12) United States Patent  
Meyersweissflog

(10) Patent No.: US 7,423,420 B2
(45) Date of Patent: Sep. 9, 2008

(54) MAGNETIC FIELD-SENSITIVE SENSOR

(75) Inventor: Stephan Meyersweissflog, Rudelzhausen (DE)

(73) Assignee: Woelke Magnetbandtechnik GmbH & Co. KG, Schweltenkirchen (DE)

( * ) Notice: Subject to any disclaimer, the term of this patent is extended or adjusted under 35 U.S.C. 154(b) by 87 days.

(21) Appl. No.: 11/490,477

(22) Filed: Jul. 19, 2006

(65) Prior Publication Data

US 2007/0024280 A1   Feb. 1, 2007

(30) Foreign Application Priority Data

Jul. 19, 2005   (DE) ................... 20 2005 011 361 U

(51) Int. Cl.
- *G01P 3/48* (2006.01)
- *G01B 7/14* (2006.01)
- *G01R 33/09* (2006.01)
- *H01L 43/08* (2006.01)

(52) U.S. Cl. .................. 324/174; 324/207.21
(58) Field of Classification Search ................. 324/166, 324/167, 173, 174, 179, 207.2, 207.21, 207.22, 324/207.24, 207.25; 73/514.39
See application file for complete search history.

(56) References Cited

U.S. PATENT DOCUMENTS

| | | | |
|---|---|---|---|
| 4,506,217 A * | 3/1985 | Rothley et al. ......... 324/207.21 |
| 4,612,502 A * | 9/1986 | Spies ..................... 324/207.22 |
| 4,725,776 A * | 2/1988 | Onodera et al. ........ 324/207.21 |
| 4,785,242 A * | 11/1988 | Vaidya et al. .......... 324/207.25 |
| 5,021,736 A * | 6/1991 | Gonsalves et al. .......... 324/202 |
| 5,289,122 A | 2/1994 | Shigeno |
| 5,315,244 A | 5/1994 | Griebeler |
| 5,500,589 A * | 3/1996 | Sumcad ..................... 324/202 |
| 5,955,882 A * | 9/1999 | Eisschiel et al. ........ 324/207.21 |
| 6,218,829 B1 | 4/2001 | Wittenstein et al. |
| 6,246,234 B1 * | 6/2001 | Yokotani et al. ....... 324/207.21 |
| 6,255,811 B1 * | 7/2001 | Hatazawa et al. ...... 324/207.21 |

FOREIGN PATENT DOCUMENTS

| | | |
|---|---|---|
| DE | 29614974 U1 | 1/1997 |
| DE | 19643183 A1 | 11/1997 |
| EP | 0109296 A2 | 5/1984 |
| EP | 0419040 A1 | 3/1991 |

* cited by examiner

*Primary Examiner*—Kenneth J Whittington
(74) *Attorney, Agent, or Firm*—Alleman Hall McCoy Russell & Tuttle LLP

(57) ABSTRACT

A sensor, preferably for magnetic rotary or linear sensor systems, includes a scale situated at a specified distance from the sensor, and having at least one magnetic field-sensitive GMR sensor element provided in a housing, the housing also having one magnetic field source respectively associated with the at least one GMR sensor element, the magnetic field source being accommodated in a shield enclosing same in a U-shape, and the magnetic field source, the at least one GMR sensor element, and/or the housing being tilted at a specified distance and by a predetermined angle relative to the reference plane of the scale.

19 Claims, 3 Drawing Sheets

MAGNETIC FIELD-SENSITIVE SENSOR

CROSS-REFERENCE TO RELATED APPLICATION

This application claims priority to German Utility Model Application Serial No. 20 2005 011 361.1 filed Jul. 19, 2005, which is hereby incorporated by reference in its entirety for all purposes.

The invention relates to a sensor that is preferably suited for magnetic rotary or linear sensor systems having a scale situated at a specified distance from the sensor, and having at least one magnetic field-sensitive GMR sensor element provided in a housing, the housing also having one magnetic field source respectively associated with the at least one GMR sensor element, wherein the magnetic field source is accommodated in a shield enclosing the same in a U-shape, and the magnetic field source, the at least one GMR sensor element, and/or the housing are tilted at a specified distance and by a predetermined angle relative to the reference plane of the scale.

For magnetic rotary or linear sensor systems in which the scale is composed of soft magnetic material (for example, a gear rack, gearwheel, or grooved band made of soft magnetic steel) or permanent magnets suitably situated with respect to one another (for example, small permanent magnets on a strip, or differently magnetized regions in a semimagnetic tape), sensors provided with the actual magnetic field-sensitive sensor element as well as a constant magnetic source (a permanent magnet, for example) are used as a scanner unit. In the past, magnetic field-sensitive resistors (magnetoresistors, magnetoresistive elements) have been used as magnetic field-sensitive sensor elements.

Such magnetic field-sensitive sensors are known. Such sensors for measuring lengths and angles are described in DE 32 40 794 C2 and DE 39 26 328 A1. It is known from DE 38 29 390 A1 to use these magnetic field-sensitive sensors for measuring rotational speed.

As known from DE 296 14 974 U1, for example, two sinusoidal signal tracks phase-shifted by 90° and a reference signal track exhibiting a single pulse are required.

So-called giant magnetoresistive (GMR) sensors have been used for quite some time as sensor elements. The basic objective of the sensor assembly is to produce a given response characteristic, i.e., a sensor characteristic curve, having the greatest possible useful signal swing, i.e., the largest possible useful signal/interference power ratio. In establishing a "linear" sensor characteristic curve, a sinusoidal signal, or at least a signal that approximates a sine wave (also referred to below as "sinusoidal"), is expected as an output signal.

In practice, however, in the assembly of, for example, a two-track sensor element to be used according to DE 296 14 974 U1, taking into account the specifications of the GMR sensor manufacturer (NVE Corporation, for example), no sinusoidal output signals result which have a suitable useful signal swing. In consideration of the typical installation specifications, the signals exhibit nonlinear distortions of varying intensity, and various offset voltages and signal swings are seen. By increasing the working distance between the sensor elements and the mechanical scale, the signal curves approximate a sine wave. However, this causes disproportionate decreases in signal amplitudes, resulting in an unacceptable useful signal/interference power ratio.

The object of the invention, therefore, is to refine a magnetic field-sensitive sensor of the above-mentioned species in such a way that, for the greatest possible useful signal swing, a desired signal curve may be achieved without undesirable interferences.

This object is achieved according to the invention by a sensor, preferably for magnetic rotary or linear sensor systems, having a scale situated at a specified distance from the sensor, and having at least one magnetic field-sensitive GMR sensor element provided in a housing, the housing also having one magnetic field source respectively associated with the at least one GMR sensor element. According to the invention, the magnetic field source is embedded in a U-shaped shield. The magnetic field source, the at least one GMR sensor element, and/or the housing are tilted at a specified distance and by a predetermined angle relative to the reference plane of the scale. As a result of this tilt, the sensor element may be moved to its operating point U0 (electrical output voltage) or B0 (magnetic induction). Starting from this operating point, the magnetic field B(t) in the measuring region of the sensor element is uniformly and alternatingly, i.e., in this case sinusoidally, for example, modulated about the operating point B0, for example by the homogeneous alternating gearing of the mechanical scale that is moved over time. The sensor element responds to the temporally modulated magnetic field B(t) with a sinusoidal electrical output value U(B(t)). The response characteristic U(B(t)) of the sensor element is consequently linearized by the operating point setting, i.e., according to the degree of tilt of the magnetic field source, the GMR sensor element, or the housing in which these elements are installed.

However, by appropriate angular tilting of the above-mentioned elements a desired specialized signal curve may also be selected. For certain measurements it may be useful to establish a sensor characteristic curve having a nonlinear response characteristic. This may then be controlled by the choice of the corresponding tilt angle, for example of the magnetic field source, the GMR sensor element, and/or the housing in which these elements are installed.

The U-shaped shield is made of a soft magnetic material. The shield advantageously prevents so-called signal crosstalk. In this case, "signal crosstalk" is understood to mean that wave-shaped interference signals as well as small-curve continuous interferences appear in the signal curve.

Furthermore, a GMR sensor element may be associated with a reference signal track provided in the scale for generating a reference signal.

Two GMR sensor elements may be associated with the incremental signal track in such a way that two phase-displaced signals, for example, two signals displaced by 90°, are generated, as is basically known from DE 296 14 974 U1—but in that citation, using magnetoresistors.

It is particularly advantageous when the permanent magnet used is cuboidal, the dimensions thereof being selected with respect to the associated GMR sensor element in such a way that an essentially homogeneous magnetic field acts on the GMR sensor element.

The permanent magnet advantageously has a magnetic field strength greater than 0.2 T.

The housing in which the GMR sensors and the associated permanent magnets are installed preferably is made of aluminum.

The housing may have a thin front wall, directly behind which the at least one GMR sensor element is situated.

It is particularly preferred for at least one magnetic field source to be fixed in place by a plastic mounting in the housing. Such a plastic mounting has at least one slot for accommodating the magnetic field source. The magnetic field source may be glued into the slot at the particular desired tilt angle.

The plastic mounting may advantageously accommodate two magnetic field sources, one of which is situated opposite from the at least one GMR sensor element associated with the incremental signal track, whereas the other magnetic field source is situated opposite from the GMR sensor element associated with the reference signal track.

The two magnetic field sources are mounted in different positions with respect to one another in the plastic mounting.

It may be advantageous to also use one large magnet, which then has a less cuboidal to square shape, and advantageously is fixed in place tilted in the plastic mounting, thereby covering as a whole and magnetically permeating the at least one GMR sensor element associated with the incremental signal track and the GMR sensor element associated with the reference signal track.

According to a further embodiment of the invention, all GMR sensors and magnetic field sources are installed in the housing in a fixed associated relationship with one another.

The geometric association is advantageously selected so that a "linear" sensor characteristic curve may be produced.

Alternatively, the geometric association may also be selected such that a given targeted "nonlinear" sensor characteristic curve is produced.

The invention further relates to a scale for a previously described sensor, the scale comprising a gearwheel or gear rack made of ferromagnetic or soft magnetic material. This scale advantageously has involute gearing.

A reference track for generating a reference signal is also present, and a gear tooth may be provided on the reference track for generating the reference signal.

This gear tooth on the reference track may be milled from a conventional involute gear tooth. However, the reference signal may also be generated by a groove, having a coordinated width, milled into the gearwheel which recedes with respect to the overall circumference circumscribed at a given height.

According to the present invention, the previously described sensor may be used as a rotary or linear sensor.

However, the previously described sensor may also advantageously be used for measuring a gear tooth profile.

Further features, particulars, and advantages of the invention result from the exemplary embodiments illustrated in the drawings, which show the following:

FIG. 3b shows a schematic top view of the housing according to FIG. 3a;

Figure 1:
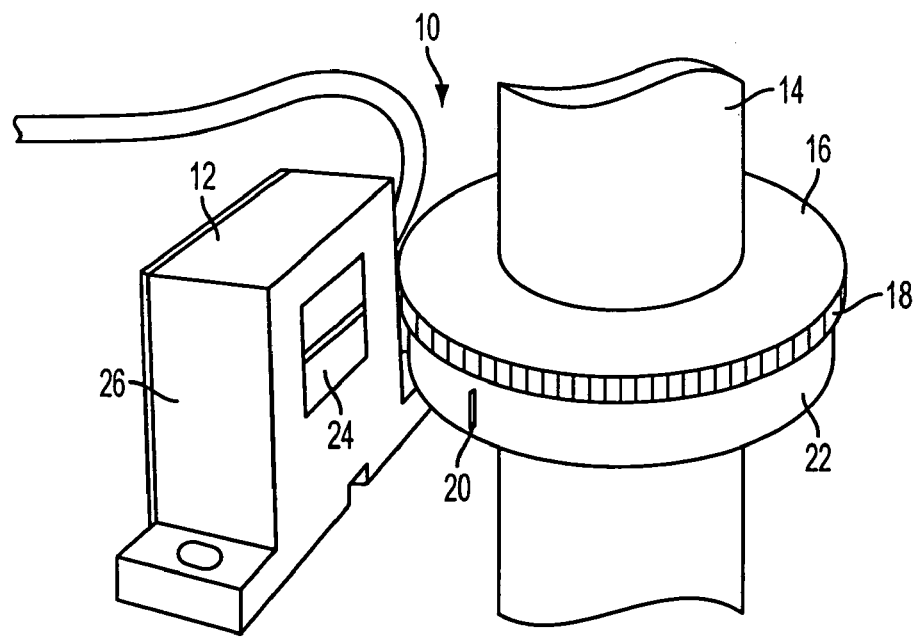
FIG. 1 shows a perspective view of a sensor system in schematic form, in which the sensor according to the invention may be used.

FIG. 1 shows as an example a rotary sensor system 10 comprising a sensor or scanning head 12, and a gearwheel 16 which is situated on a shaft 14 and used as a scale, and having involute gearing 18 not illustrated in greater detail here. The measurement principle used here is based on contactless scanning of the geared ferromagnetic scale 16 by means of magnetic field-sensitive sensor elements installed in the sensor or scanner.

The gearwheel 16 has an incremental track 18 provided with a uniform involute gearing, and a zero track 22 provided with a single reference gear tooth 20.

Sensors, not illustrated here in greater detail, are each situated in a sensor window 24 inside the housing 26, at the level of the incremental track 18. A sensor is also provided at the level of the zero track 22. The sensor window 24 illustrated in the figure is actually covered by a thin aluminum layer.

Figure 3A:
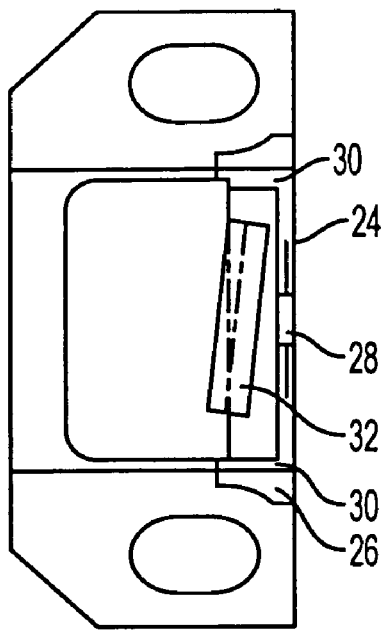
FIG. 3a shows a section of a housing in which sensor elements and magnets are installed.
Figure 3B:
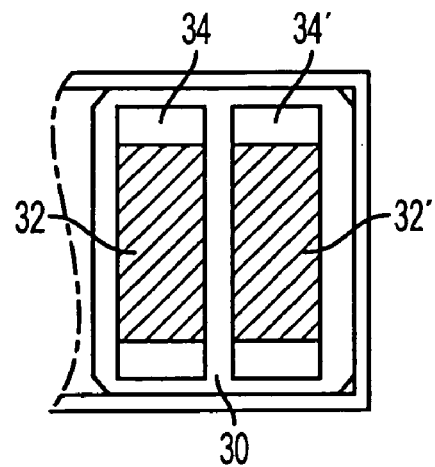

The structure of the sensor unit is shown by the schematic illustration according to FIG. 3a or 3b, in which the housing 26 made of aluminum is shown once again. The GMR sensors 28 are situated in the region of the sensor window 24. A cuboidal permanent magnet 32 is mounted in a frame structure 30, made of plastic, which is accommodated in the housing 26. The permanent magnet is not directly mounted in the plastic housing, but instead is first embedded in a U-shaped shield. As shown in FIG. 3b, two permanent magnets 32 and 32' together with their U-shaped shield (not illustrated) are glued into corresponding slots 34 and 34' in the plastic frame 30.

To simplify the positioning of the permanent magnets together with their shields, stops may be provided in the plastic frame. Because of the fine adjustment required, however, the stops are used primarily for positioning of the permanent magnet for the reference track.

Figure 6:
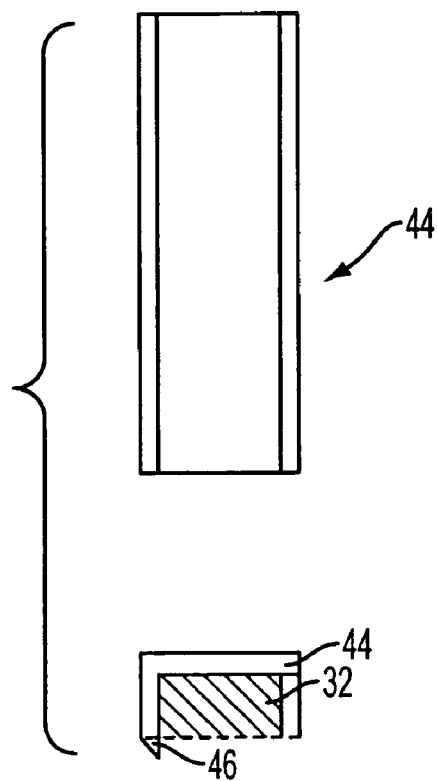
FIG. 6 is a cross-sectional illustration of a shield.

The U-shaped shield 44 is illustrated in FIG. 6, for example. The upper diagram shows a top view, and the lower diagram shows a cross-sectional view, in which case a permanent magnet is embedded. The shield is composed of a soft magnetic material, for example 90MnCrV8. As seen on the left side of the cross-sectional illustration in FIG. 6, the respective edge may be profiled so that a sharp edge 46 flush with the magnet is produced. Alternatively, the edge may also be provided as shown on the right side of this drawing. In addition to the U-shaped enclosure, however, the end face sides may also be enclosed.

When the gearwheel 16 together with the shaft 14 undergoes rotary motion, the magnetic field generated by the permanent magnets 32 or 32' on the respective sensor unit 28 is modified in such a way that an electrical signal is generated.

As a result of the rotation of the gearwheel 16, a voltage signal that is approximately sinusoidal is obtained at the output of a corresponding bridge circuit. The sensor units 28 are positioned so that they generate a signal that in each case is phase-shifted by 90°. The 90° phase-shifted signals A and B from the sensor units are illustrated in FIG. 2 as an example.

Figure 4:
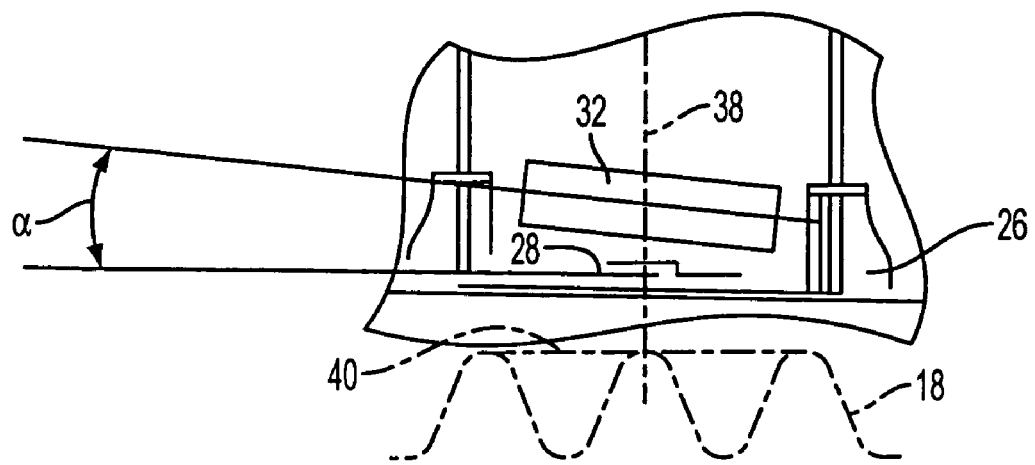
FIG. 4 shows a schematic illustration of the orientation of the housing, sensor element, and permanent magnet with respect to a gear tooth of the scale.

If a given response characteristic, i.e., a sensor characteristic curve, having the greatest possible useful signal swing, i.e., the largest possible useful signal/interference power ratio, is now produced, the magnetic field source, the at least one GMR sensor element, and/or the housing are tilted at a specified distance and by a predetermined angle relative to the reference plane of the scale. The corresponding geometric relationships are explained with reference to the illustration according to FIG. 4, in which the reference plane is represented by a gear tooth 38 of an involute gearing. At this location the housing 26 is oriented perpendicular to the gear tooth, i.e., parallel to the tangential plane 40 relative to the gear tooth 38. In the illustration according to FIG. 4 the sensor element 28, i.e., the GMR sensor, is also oriented parallel to the tangential plane 40, i.e., to the housing 26. In contrast, the permanent magnet 32, which here comprises a cuboidal body, is tilted at an angle a relative to the tangential plane 40. Within the scope of the invention, however, the housing 26 and/or the GMR sensor 28 may also be tilted in order to orient the magnet 32 parallel to the tangential plane 40.

In the optimization of the signal, it should be kept in mind that the period length of the mechanical scale requires the scanning length of the sensor element used to be correspondingly adjusted. Furthermore, for signal optimization a given relationship results for the distances between the mechanical scale and the sensor element, and between the sensor element and the permanent magnet, which likewise must be adjusted. Tests have shown that the dimensions of the permanent magnet surface facing the sensor should be at least $11 \times 5$ mm$^2$. In the region of the sensor element a sufficiently homogeneous magnetic field is thus generated which has a size of up to approximately $1 \times 0.125$ mm$^2$. When smaller magnets are used, larger differences in the offset voltage of the individual signal traces are observed.

Figure 2:
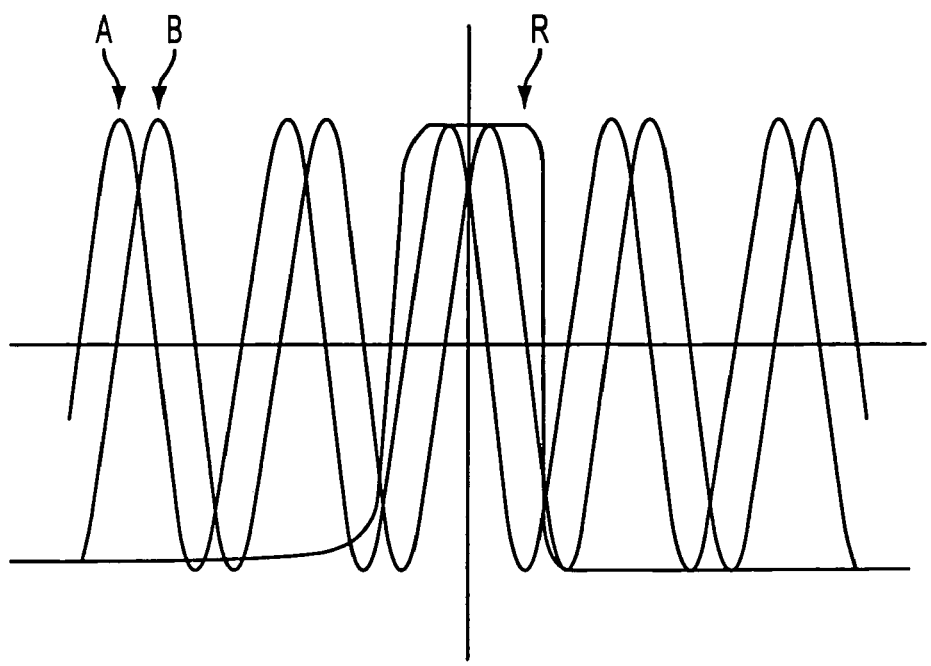
FIG. 2 shows the output signals from the sensor system which are generated according to one preferred exemplary embodiment.
Figure 5:
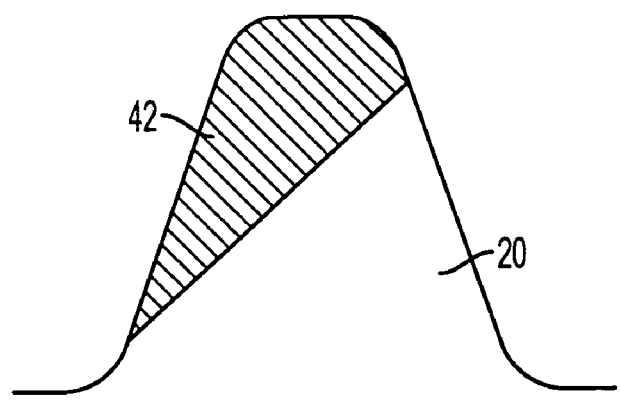
FIG. 5 shows a schematic illustration of the shaping of the reference gear tooth on the reference track.

In addition to the useful signals A and B, FIG. 2 illustrates a reference signal R which is generated by a parallel sensor unit, situated at the level of the zero track 22, when the reference gear tooth 20 passes by. As illustrated in FIG. 5, the reference gear tooth 20 may be produced from a customary involute gear tooth by appropriate profile machining. An involute gear tooth is machined by milling off the portion 42 illustrated in crosshatch by way of example in FIG. 5, so that a type of sawtooth profile remains. The sawtooth profiling of this reference gear tooth 20 results in a bundling of the magnetic field lines which ensures generation of the correct reference signal, regardless of the type of sensor used. The corresponding correct reference signal is also generated when magnetoresistors are used instead of GMR sensors.

The processing electronics have a conventional design, and are not illustrated here in greater detail. The processing electronics may be situated in an external electronic module, but are also advantageously provided in the sensor head. Amplification, parameter adjustment of offset and amplitude, as well as phase position and position of the reference signal are achieved by the processing electronics in a known manner.

The invention claimed is:

1. A sensor having a scale situated at a specified distance from the sensor, the sensor comprising:
   a housing; and
   at least one magnetic field-sensitive GMR sensor element provided in the housing, the housing also having at least one magnetic field source respectively associated with the at least one GMR sensor element, wherein the magnetic field source is accommodated in a shield enclosing the same in a U-shape, and the magnetic field source, the at least one GMR sensor element, and/or the housing are tilted at a specified distance and by a predetermined angle relative to the reference plane of the scale;
   wherein a GMR sensor element is associated with a reference signal track in the scale for generating a reference signal;
   wherein two GMR sensor elements are associated with an incremental signal track in such a way that the GMR sensor elements generate two phase-displaced signals;
   wherein the magnetic field source is fixed in place by a plastic mounting in the housing;
   wherein the plastic mounting accommodates two magnetic field sources, together with the U-shaped shield enclosing same, one of which is situated opposite from the at least one GMR sensor element associated with the incremental signal track, whereas the other magnetic field source is situated opposite from the GMR sensor element associated with the reference signal track.

2. The sensor according to claim 1, wherein the U-shaped shield comprises a soft magnetic material.

3. The sensor according to claim 1, wherein the magnetic field sources comprise at least one permanent magnet.

4. The sensor according to claim 3, wherein the permanent magnet is cuboidal, the dimensions thereof being selected with respect to the associated GMR sensor element in such a way that an essentially homogeneous magnetic field acts on the GMR sensor element.

5. The sensor according to claim 3, wherein the permanent magnet has a magnetic field strength greater than 0.2 T.

6. The sensor according to claim 1, wherein the housing comprises aluminum.

7. The sensor according to claim 1, wherein the housing has a thin front wall, directly behind which the at least one GMR sensor element is situated.

8. The sensor according to claim 1, wherein the plastic mounting has at least one slot for accommodating at least one of the magnetic field sources.

9. The sensor according to claim 8, wherein the at least one magnetic field source is glued into the slot at an angle.

10. The sensor according to claim 1, wherein the two magnetic field sources are mounted in different positions with respect to one another in the plastic mounting.

11. The sensor according to claim 10, wherein all GMR sensors and magnetic field sources are installed in the housing in a fixed associated relationship with one another.

12. The sensor according to claim 11, wherein the fixed association is a geometric association and is selected so that a linear sensor characteristic curve may be produced.

13. The sensor according to claim 12, wherein the geometric association is selected so that a specified nonlinear sensor characteristic curve may be produced.

14. The sensor according to claim 1, wherein a large magnet is mounted in the plastic mounting so as to cover the sensor elements for both tracks.

15. A system comprising:
   a sensor including a housing; and at least one magnetic field-sensitive GMR sensor element provided in the housing, the housing also having at least one magnetic field source respectively associated with the at least one GMR sensor element, wherein the magnetic field source is accommodated in a shield enclosing the same in a U-shape, and the magnetic field source, the at least one GMR sensor element, and/or the housing are tilted at a specified distance and by a predetermined angle relative to a reference plane of a scale; wherein a GMR sensor element is associated with a reference signal track in the scale for generating a reference signal; wherein two GMR sensor elements are associated with an incremental signal track in such a way that the GMR sensor elements generate two phase-displaced signals; wherein the magnetic field source is fixed in place by a plastic mounting in the housing; wherein the plastic mounting accommodates two magnetic field sources, together with the U-shaped shield enclosing same, one of which is situated opposite from the at least one GMR sensor element associated with the incremental signal track, whereas the other magnetic field source is situated opposite from the GMR sensor element associated with the reference signal track; and the scale situated at a specified distance from the sensor, the scale including a gearwheel or gear rack made of ferromagnetic or soft magnetic material.

16. The system according to claim 15, wherein the scale has involute gearing.

17. The system according to claim 15, wherein a gear tooth or groove is provided on the reference track for generating the reference signal.

18. The system according to claim 17, wherein the gear tooth on the reference track is milled from an involute gear tooth.

19. The system according to claim 18, wherein the sensor is a magnetic rotary or linear sensor.

* * * * *